Figure 1:
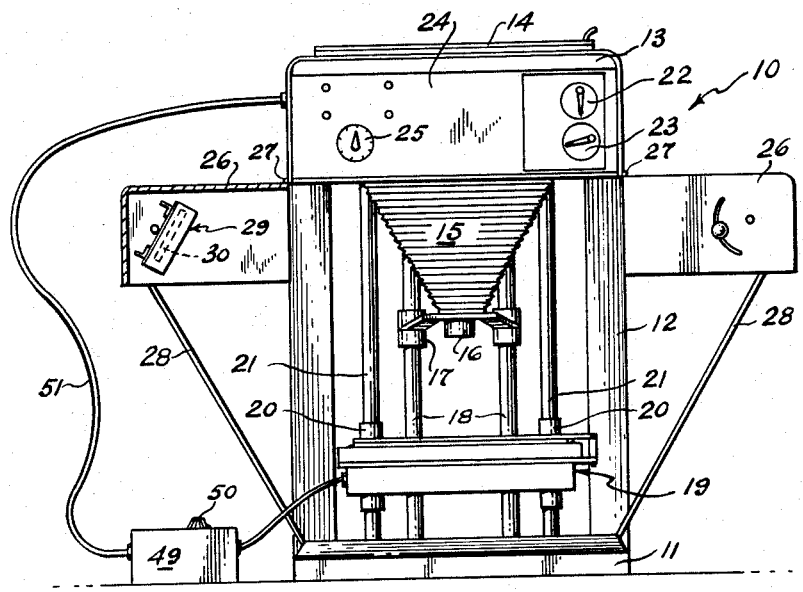

INVENTORS
KENNETH B. BEATTIE &
ROLAND P. BEATTIE, II
BY
ATTORNEY

3,119,301
LIGHTING SYSTEM FOR PHOTOGRAPHIC
CAMERAS
Kenneth B. Beattie, Gladstone, and Roland P. Beattie II,
Madison, N.J., assignors to Kenro Graphics, Inc.,
Cedar Knolls, N.J., a corporation of New Jersey
Filed Jan. 31, 1962, Ser. No. 170,164
1 Claim. (Cl. 88—24)

This invention relates generally to photographic cameras of the kind used to make line and half-tone negatives for lithographic, photoengraving and gravure plate making, in preparing and proofing paste-ups, for resizing photocomposition and electronic engraving copy, to make line and half-tone negatives, Ektalith, Geva copy and xerographic masters for offset duplicating, or to make direct copies of the subject material at the same or different size, and more particularly is directed to improvements in the lighting systems of such photographic cameras.

Cameras of the described character generally include a back or head for holding the photosensitive film or plate, a copy board for supporting the copy or material to be photographed, a lens system for projecting an image of the copy or material onto the photosensitive film or plate, with the lens system and copy board being movable relative to the film or plate in the direction of the optical axis of the camera for varying the size relationship of the copy and the image thereof projected onto the photosensitive film or plate, and a lighting system consisting of sources of illumination disposed between the copy board and the back or head of the camera at locations which are outside of the optical field of the lens system so that the image is formed by light reflected from the copy or material on the copy board.

Although lighting systems have been proposed for providing substantially uniform illumination directed against the surface of the copy board supporting the copy or material to be photographed, for example, in our copending application for United States Letters Patent filed October 5, 1960, and identified as Serial No. 60,689, now abandoned, it has been found that such existing lighting systems do not avoid the necessity of employing considerable hand retouching of the photographic negatives when the cameras are employed for certain photographic procedures. For example, when photographing a "paste-up," that is, a base carrier paper to which are adhesively secured individual printed pieces, the described illuminating systems create shadows along the edges of the individual printed pieces secured on the base carrier paper, and these shadows appear on the photographic negative as white lines which have heretofore been eliminated by hand using a brush and "opaque." Further, in direct offset plate exposures, the texture of the paper upon which the original is typed or drawn creates a "background" effect when the existing lighting systems are employed for reflected illumination of the original carried by the copy board. It has also been found that, during the electrostatic exposure of an offset plate in a camera of the described character, "toning" occurs at the edges of the work, and this has to be wiped off through the use of a cotton swab before fusion is effected. It has further been found that, when employing a camera of the described character with the existing lighting systems for preparing half-tone negatives, the white areas of the material being copied do not appear perfectly white on prints made from the half-tone negative, so that it is frequently necessary to employ hand retouching for "dropping out" the highlights of half-tone negatives.

Accordingly, it is an object of the present invention to provide an improved lighting system for cameras of the described character which will avoid the above mentioned disadvantages of existing lighting systems, particularly when employed in connection with the stated photographic procedures.

Another object is to provide a copy board embodying an auxiliary lighting system which, in combination with the existing lighting system of cameras of the described character, avoids the mentioned disadvantages of those existing lighting systems.

In accordance with an important aspect of the present invention, the usual lighting system of a photographic copying camera, that is, light sources disposed between the copy board and the back or head and directed toward the surface of the copy board supporting the copy or material to be photographed, is supplemented by illuminating means disposed in back of, or under the copy board, that is, at the side of the latter facing away from the surface supporting the copy or material, while the copy board is formed of a light transmitting material so that the copy or material is illuminated both by reflected light and transmitted light. It has been found that, where the copy or material to be photographed is at least semi-translucent, the transmitted light from the additional or supplemental illuminating means is effective to eliminate the shadows normally occurring at the edges of the printed pieces of paste-ups, removes the "background" effect due to the texture of the paper on which the original is typed or drawn in direct offset plate exposures, eliminates the "toning" of the background in the electrostatic exposure of offset plates, and automatically "drops out" the highlights or desired pure white areas in the preparation of half-tone negatives.

A further object is to provide an improved lighting system having the above advantages, and being relatively simple and inexpensive to construct and operate, as well as being suitable for adaptation to existing cameras with minimum modification of the latter.

Figure 2:
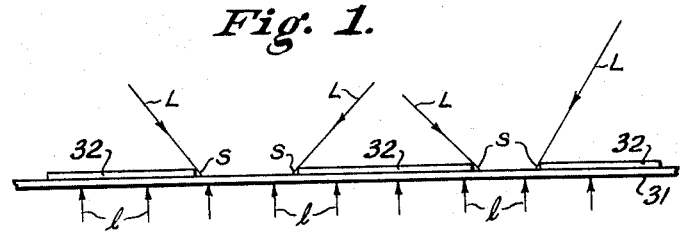
Figure 3:
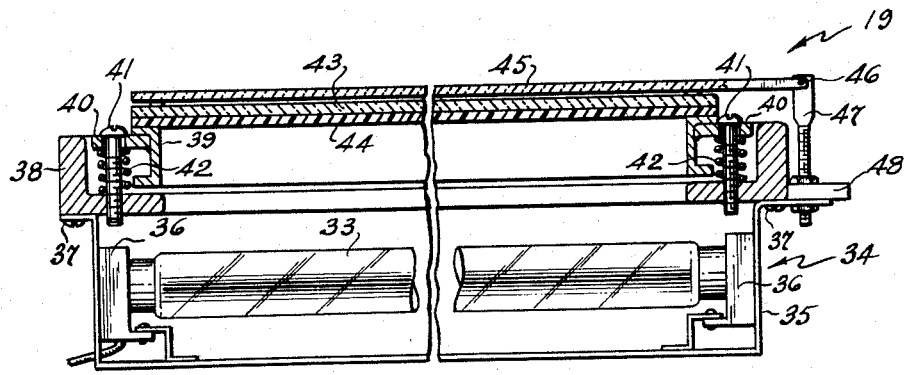

The above, and other objects, features and advantages of the invention, will be apparent in the following detailed description of an illustrative embodiment thereof which is to be read in connection with the accompanying drawing forming a part hereof, and wherein:

FIG. 1 is a front elevational view of a photographic copying camera having a lighting system embodying the present invention;

FIG. 2 is an enlarged diagrammatic view illustrating the use of the lighting system embodying the invention in effecting illumination of a paste-up during photographic copying of the latter; and FIG. 3 is an enlarged, transverse sectional view of the copy board of the camera in FIG. 1 and of the additional or supplemental illuminating means provided as a part of the copy board in accordance with the present invention.

Referring to the drawing in detail, and initially to FIG. 1 thereof, it will be seen that a photographic copying camera there generally identified by the reference numeral 10 and having a lighting system embodying the present invention may be of the type having a vertically arranged optical axis. The camera 10 is shown to include a base 11 having a frame 12 extending vertically upward at the back thereof to support a cantilevered housing 13 which projects forwardly over the base. Removably mounted on the top of housing 13 is a back or head 14 which is adapted to contain the photosensitive film or plate during the operation of the camera and which may be interchangeably replaced by a known vacuum or prismatic head or by an Ektalith, Geva copy or xerographic adaptor depending upon the use to be made of the camera. A bellows 15 depends from the bottom of housing 13 and, at its lower end, is connected to a lens holder 16 which is removably mounted in a carrier 17 slidable vertically on guides 18 forming part of the back frame 12.

Camera 10 further includes a copy board assembly 19 hereinafter described in detail and which is disposed in a horizontal plane below lens holder 16 and rigidly connected to slides 20 vertically movable on guide bars 21 adjacent guide bars 18 and also forming part of the back frame 12. The carrier 17 for lens holder 16 and the copy board assembly 19 are independently vertically adjustable toward and away from the fixed horizontal plane of head or back 14 by means of suitable mechanisms (not shown) which form no part of the present invention, and which are operated by control knobs 22 and 23, respectively, mounted on a control panel 24 at the front of housing 13. Control panel 24 also carries an exposure control knob 25 and any other controls that may be required for the operation of the camera.

The usual lighting system of the camera 10 includes light housings 26 disposed at the opposite sides of camera housing 13 and being joined to the latter, at the lower side edges of housing 13, for example, by hinges 27. Each housing 26 opens downwardly and inwardly toward the copy board assembly 19 and is further supported by a leg or brace 28 extending downwardly from the outer portion of the related light housing 26 to the base 11 of the camera.

Each light housing 26 contains a main light assembly 29 directing light downwardly and inwardly upon the upper surface of copy board assembly 19 which supports the copy or material to be photographed. The light assemblies 29 may be of the type disclosed in detail in our previously mentioned copending application Serial No. 60,689, and preferably include elongated tubular light sources 30 emitting light along substantially their entire lengths and which may be of the kind available commercially from The General Electric Corporation as G.E. Quartzline Lamps under the designation G.E. 500T39/CL.

The purpose of the light assemblies 29 as disclosed in our copending application Serial No. 60,689, is to provide illumination of the upper surface of copy board assembly 19 in a manner that ensures a substantially uniform intensity of illumination of the image projected by the lens system onto the photosensitive film or plate in holder 14 for all adjusted vertical positions of the copy board assembly 19. However, even such illumination of the copy or material cannot avoid the extensive hand retouching of the negative or other sensitized film or plate that is frequently necessary when using a photographic copying camera.

For example, as illustrated in FIG. 2, when preparing a negative of a paste-up which includes a sheet 31 of backing paper and printed pieces 32 adhesively secured to the sheet 31, the light rays L directed against the paste-up by the light assemblies 29 produce shadows, as at S, along the edges of the printed pieces 32 by reason of the thickness of the latter. The shadows S appear, as white lines, on the produced negative, which lines have to be removed by hand retouching of the negative with a brush and "opaque."

In accordance with the present invention, the necessity for such hand retouching of the negative of the paste-up is avoided by additionally illuminating the paste-up at the back or underside of the sheet of backing paper 31 which is at least translucent or semi-transparent so that the light rays 1 (FIG. 2) representing such additional illumination are transmitted through sheet 31 to illuminate the upper or front surface of the latter at the edges of the pasted pieces 32 which would normally be in shadow, as indicated at S.

As shown in FIG. 3, the additional illumination for eliminating shadows at the edges of the pasted pieces of the paste-up is provided by light sources, preferably in the form of fluorescent lamps 33 included in an additional or supplemental light assembly 34 forming part of the copy board assembly 19. The additional or supplemental light assembly 34 further includes an upwardly opening box or housing 35 having sockets 36 mounted therein to support the fluorescent lamps 33 and being formed with a flange 37 along its upper edge for attachment of the box 35 to the bottom of a generally rectangular cast frame 38 of the copy board assembly. The assembly 19 further includes an inner rectangular frame 39 which may be formed of channels, as shown, and which has apertured lugs 40 projecting therefrom and being vertically slidable on adjustment screws 41 threaded into tapped holes in the bottom of frame 38. A helical compression spring 42 extends around each adjustment screw 41 between the related lug 40 and the bottom of frame 38 to yieldably urge the lug 40 against the head of screw 41 so that turning of the adjusting screws 41 is effective to adjust the vertical position and level of the top of inner frame 39.

The copy or material to be photographically reproduced is supported by the top surface of a glass support sheet or plate 43 having a diffusion screen 44 secured to its lower surface, and which may be formed of opal or milk glass, or methylmethacrylate having a dispersion of white pigment therein. The glass support plate 43 and the diffusion screen 44 are supported, at their peripheries, on the top of inner frame 39 so that light from the fluorescent lamps 33 is diffused by the screen 44 and passes upwardly through the glass support plate 43 for illuminating the undersurface of the copy or material on plate 43.

In order to hold the copy or material to be photographed smoothly on support sheet 43, the copy board assembly 19 further includes a glass copy cover 45 which is hingedly supported, as at 46, on vertically adjustable pivots 47 carried by extensions 48 of the outer frame 38.

The fluorescent lamps 33 of the supplemental light assembly 34 are preferably energized from a timing control and power unit 49 (FIG. 1) that includes the usual ballast for the fluorescent lamps, relays and a timer that is adjustable through a knob 50. The timing control and power unit 49 is preferably connected through a cable 51 to the energizing circuits of the existing camera 10 so that, upon the starting of an exposure, the fluorescent lamps 33 of supplemental light assembly 34 are energized simultaneously with the lamps 30 of the light assemblies 29 with the duration of energization of the lamps 33 being controlled through the timer associated with the knob 50 independently of the duration of energization of the lamps 30.

Although the utility of the light projected upwardly through the glass support plate 43 from the supplemental light assembly 34 has been described above with particular reference to the production of a negative of a paste-up, as shown in FIG. 2, it is to be noted that the combination of the reflected illumination from light assemblies 29 and the transmitted illumination from supplemental light assembly 34 is advantageously employed in connection with other photographic processes. For example, in direct offset plate exposures, the usual "background" effect resulting from the texture of the paper upon which the original is typed or drawn is eliminated by the light transmitted through glass support plate 43 and through the translucent or semi-transparent paper. It has also been found that, during the electrostatic exposure of an offset plate, the "toning" that usually occurs at the edges of the work or in the background and heretofore has been wiped off with a cotton swab before fusion is effected, is eliminated by the light transmitted through glass support plate 43 from the supplemental light assembly 34. Finally, when preparing half-tone negatives, the light transmitted from the supplemental light assembly 34 effects automatic "dropping out" of the highlights of the half-tone negative, thereby avoiding the hand retouching that has been previously required for emphasizing the highlights.

The combination of the transmitted illumination with the reflected illumination further improves the detail of either half-tone negatives or continuous tone copy negatives. The combined illumination also improves contrast in such negatives as black areas of the copy or material being copied photographically do reflect some light, and therefore would appear only as dark greys, but such black areas are opaque with respect to the transmitted light and thus raise the contrast between the black and white areas of the copy. It should also be noted that, in the case of paste-ups, the use of the combined illumination ensures that the produced negative will not discriminate between pasted-on pieces having different textures or printed with differently colored inks, as such inks, being opaque, equally resist the passage of the transmitted light even though they reflect light to different degrees.

Although an illustrative embodiment of this invention has been described in detail herein with reference to the accompanying drawing, it is to be understood that the invention is not limited to that precise embodiment, and that various changes and modifications may be effected therein by one skilled in the art without departing from the scope or spirit of the invention, except as defined in the appended claim.

What is claimed is:

A method of illuminating a "paste-up" during the photographic reproduction thereof, the "paste-up" having a base carrier sheet which is at least semi-transparent and pieces of substantially opaque copy adhesively secured to one surface of said carrier sheet, said method comprising (a) directing light against the "paste-up" at the side of the latter having said copy pieces secured to the carrier sheet so that the areas of the latter intermediate the copy pieces and the copy pieces are primarily illuminated by reflected light; and (b) simultaneously, further directing light against the other surface of said carrier sheet for transmission therethrough in the areas intermediate the opaque copy pieces, thereby to illuminate the portions of said one surface of said carrier sheet extending along the edges of said copy pieces and which are shadowed by the latter from the first-mentioned light.

References Cited in the file of this patent
UNITED STATES PATENTS
2,970,514    Collins _____ Feb. 7, 1961